US012614210B2

(12) United States Patent
Santhar et al.

(10) Patent No.: US 12,614,210 B2
(45) Date of Patent: Apr. 28, 2026

(54) OPTIMIZE AND GENERATE A PERSONALIZED CONTENT ITEM FOR DISPLAY DURING WEB PAGE LOAD TIME

(71) Applicant: INTERNATIONAL BUSINESS MACHINES CORPORATION, Armonk, NY (US)

(72) Inventors: Sathya Santhar, Chennai (IN); Sridevi Kannan, Katupakkam (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 18/493,165

(22) Filed: Oct. 24, 2023

(65) Prior Publication Data

US 2025/0131474 A1     Apr. 24, 2025

(51) Int. Cl.
*G06Q 30/0251* (2023.01)
*G06N 3/0455* (2023.01)
*G06N 3/0475* (2023.01)
*G06Q 30/0241* (2023.01)

(52) U.S. Cl.
CPC ....... *G06Q 30/0256* (2013.01); *G06N 3/0455* (2023.01); *G06N 3/0475* (2023.01); *G06Q 30/0271* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 10,938,879 B2 | 3/2021 | Jaiswal et al. | |
| 11,423,447 B2 | 8/2022 | Sotelo et al. | |
| 2012/0030338 A1* | 2/2012 | Zhang | H04L 67/02 709/223 |
| 2021/0073862 A1* | 3/2021 | Shaw | G06Q 30/0276 |
| 2022/0360637 A1* | 11/2022 | Gnanasekaran | H04L 67/025 |

(Continued)

OTHER PUBLICATIONS

"About Dynamic Search Ads", Google, 3 pp., [online][retrieved Oct. 11, 2023] https://support.google.com/google-ads/answer/2471185?hl=en.

(Continued)

*Primary Examiner* — Allan J Woodworth, II
(74) *Attorney, Agent, or Firm* — Konrad, Raynes, Davda & Victor, LLP; Janaki K. Davda

(57) ABSTRACT

Provided are techniques for optimizing and generating a personalized content item for display during web page load time. The web page load time is predicted, and a list of personalized content items with corresponding ranks is received. In response to determining that a top ranked personalized content item of the list of personalized content items does not run within the web page load time, the web page load time is split into a split generation time and a split run time. In response to determining that the split generation time is less than a threshold, a new personalized content item is generated that runs within the split run time and displayed. In response to determining that the split generation time is equal to or greater than the threshold, an existing personalized content item is summarized to run within the split run time and displayed.

20 Claims, 12 Drawing Sheets

(56) References Cited

U.S. PATENT DOCUMENTS

2023/0117085 A1\*  4/2023  Liu ................. H04N 21/44213
386/290

OTHER PUBLICATIONS

"How AI is Changing Advertising", IBM Corporation, 4 pp. [online] [retrieved Oct. 11, 2023] https://www.ibm.com/watson-advertising/thought-leadership/how-ai-is-changing-advertising.

"Take Control of Your Campaigns", Google, 10 pp. [online][retrieved Oct. 19, 2023] https://marketingplatform.google.com/about/display-video-360/.

"Manage, measure, optimize", Google, 5 pp. [online][retrieved Oct. 19, 2023] https://marketingplatform.google.com/about/campaign-manager-360/.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. et al., "The NIST Definition of Cloud Computing (Draft)", Sep. 2011, Computer Security Division Information Technology Laboratory National Institute of Standards and Technology, Total 7 pp.

\* cited by examiner

100

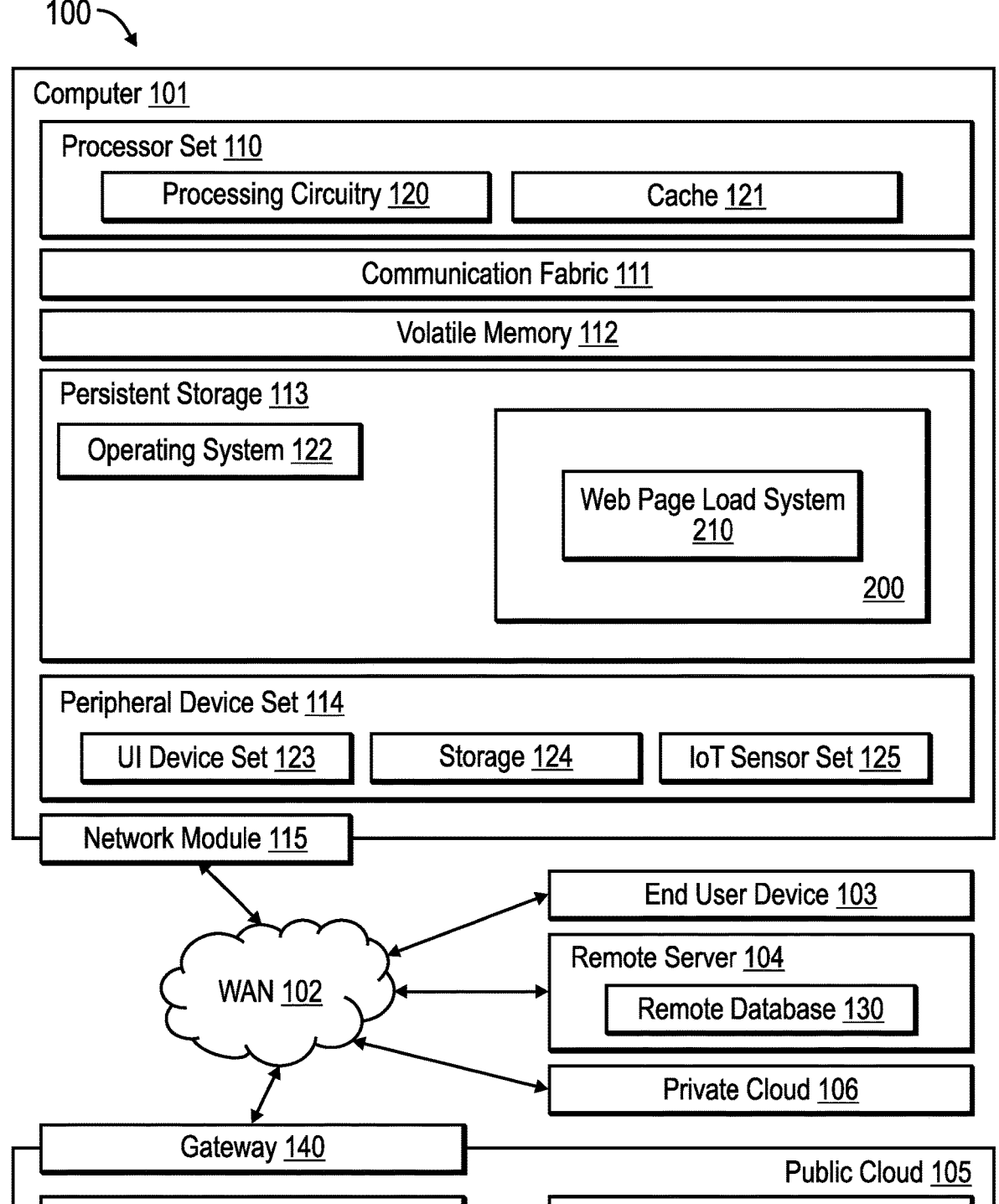

Computer 101

Processor Set 110

Processing Circuitry 120    Cache 121

Communication Fabric 111

Volatile Memory 112

Persistent Storage 113

Operating System 122

Web Page Load System 210

200

Peripheral Device Set 114

UI Device Set 123    Storage 124    IoT Sensor Set 125

Network Module 115

WAN 102

End User Device 103

Remote Server 104

Remote Database 130

Private Cloud 106

Gateway 140

Cloud Orchestration Module 141

Virtual Machine Set 143

Public Cloud 105

Host Physical Machine Set 142

Container Set 144

FIG. 1

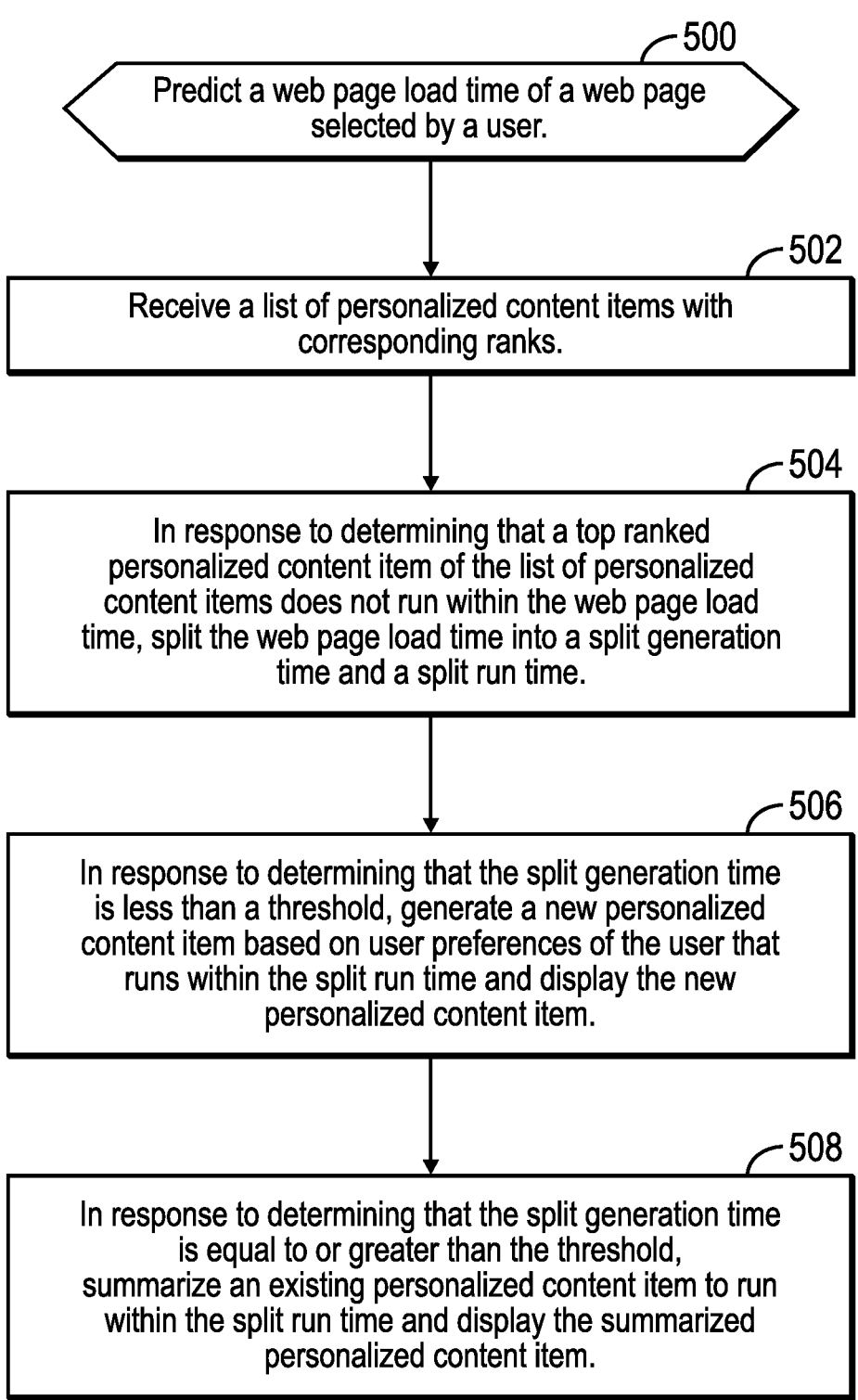

500

Predict a web page load time of a web page selected by a user.

502

Receive a list of personalized content items with corresponding ranks.

504

In response to determining that a top ranked personalized content item of the list of personalized content items does not run within the web page load time, split the web page load time into a split generation time and a split run time.

506

In response to determining that the split generation time is less than a threshold, generate a new personalized content item based on user preferences of the user that runs within the split run time and display the new personalized content item.

508

In response to determining that the split generation time is equal to or greater than the threshold, summarize an existing personalized content item to run within the split run time and display the summarized personalized content item.

FIG. 5

OPTIMIZE AND GENERATE A PERSONALIZED CONTENT ITEM FOR DISPLAY DURING WEB PAGE LOAD TIME

BACKGROUND

Embodiments of the invention relate to optimizing and generating a personalized content item for display during web page load time, for example, via edge computing.

When a user selects a web page, it may take some time to load and display that web page. However, slow-loading web pages may frustrate users and lead to a poor user experience. The users (i.e., visitors of the pages) may become impatient and abandon the website, resulting in lost engagement, conversions, and potential revenue (e.g., if the website is a sales site). Slow page load times may discourage users from exploring the website further or interacting with its features. Users may spend less time on the website, view fewer web pages, and engage less with the content of those web pages.

SUMMARY

In accordance with certain embodiments, a computer-implemented method comprising operations is provided for optimizing and generating a personalized content item for display during web page load time. In such embodiments, a web page load time of a web page selected by a user is predicted. A list of personalized content items with corresponding ranks is received. In response to determining that a top ranked personalized content item of the list of personalized content items does not run within the web page load time, the web page load time is split into a split generation time and a split run time. In response to determining that the split generation time is less than a threshold, a new personalized content item is generated based on user preferences of the user that runs within the split run time, and the new personalized content item is displayed. In response to determining that the split generation time is equal to or greater than the threshold, an existing personalized content item is summarized to run within the split run time, and the summarized personalized content item is displayed.

In accordance with other embodiments, a computer program product comprising a computer readable storage medium having program code embodied therewith is provided, where the program code is executable by at least one processor to perform operations for optimizing and generating a personalized content item for display during web page load time. In such embodiments, a web page load time of a web page selected by a user is predicted. A list of personalized content items with corresponding ranks is received. In response to determining that a top ranked personalized content item of the list of personalized content items does not run within the web page load time, the web page load time is split into a split generation time and a split run time. In response to determining that the split generation time is less than a threshold, a new personalized content item is generated based on user preferences of the user that runs within the split run time, and the new personalized content item is displayed. In response to determining that the split generation time is equal to or greater than the threshold, an existing personalized content item is summarized to run within the split run time, and the summarized personalized content item is displayed.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for optimizing and generating a personalized content item for display during web page load time. In such embodiments, a web page load time of a web page selected by a user is predicted. A list of personalized content items with corresponding ranks is received. In response to determining that a top ranked personalized content item of the list of personalized content items does not run within the web page load time, the web page load time is split into a split generation time and a split run time. In response to determining that the split generation time is less than a threshold, a new personalized content item is generated based on user preferences of the user that runs within the split run time, and the new personalized content item is displayed. In response to determining that the split generation time is equal to or greater than the threshold, an existing personalized content item is summarized to run within the split run time, and the summarized personalized content item is displayed.

BRIEF DESCRIPTION OF THE DRAWINGS

Referring now to the drawings in which like reference numbers represent corresponding parts throughout:

FIG. 1 illustrates a computing environment in accordance with certain embodiments.

FIG. 5 illustrates, in a flowchart, operations for generating a new personalized content item based on web page load time.

DETAILED DESCRIPTION

Figure 2:
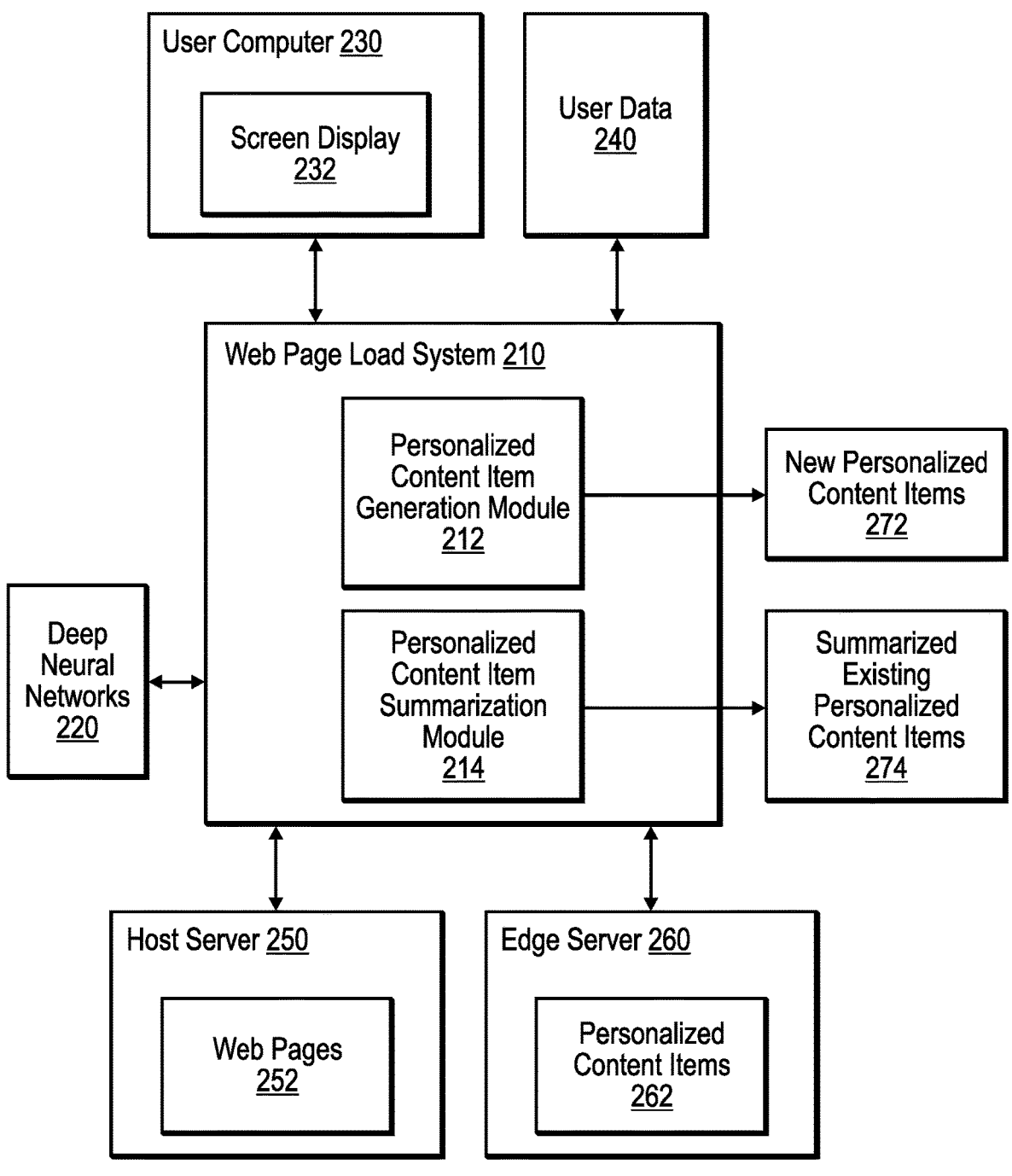
FIG. 2 illustrates, in a block diagram, details of a web page load system in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc readonly memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 of contains an example of an environment for the execution of at least some of the computer code involved in performing the inventive methods, such as a web page load system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates, in a block diagram, details of a web page load system 210 in accordance with certain embodiments. The web page load system 210 is connected to at least one user computer 230, at least one host server 250, and at least one edge server 260. The at least one user computer 230 includes a screen display 232 (e.g., part of a browser). The at least one host server 250 stores web pages 252. The at least one edge server 260 stores personalized content items 262.

The web page load system 210 includes a personalized content item generation module 212 for generating new personalized content items 272, which may be displayed on the screen display 232. The web page load system 210 includes a personalized content item summarization module 214 for summarizing existing personalized content items to output summarized existing personalized content items 274, which may be displayed on the screen display 232. In certain embodiments, the content items 262, 272, 274 are videos (e.g., videos of animals, videos of advertisements ("ads"), etc.) that may be run (i.e., played), and the videos have an associated run time (i.e., indicating how long the videos play).

In certain embodiments, the web page load system 210 receives a request from a user computer 230 for a web page 252. The web page load system 210 obtains user data 240 (e.g., from a database) for the user who issued the request. In addition, the web page load system receives existing personalized content items 262 based on the user data. In certain embodiments, the web page load system 210 determines the web page load time for the web page 252 and obtains ranks for the existing personalized content items 262 using deep neural networks 220.

In certain embodiments, the web page load system 210 predicts the users' idle time during web page load and either generates a new personalized content item 272 or outputs a summarized existing personalized content item 274 for play during the user's anticipated idle period using generative models conditioned based on the predicted time and, in some cases, user's preferences.

In certain embodiments, the web page load system 210 divides the overall load time of the web page into the edge server 260 content delivery and the host server 250 content delivery. The web page load system 210 predicts respective load times using a deep neural network based on historic data using predictors such as time of day, device type, browser type, and network speed and the real time load factors such as user's traffic, server load time, resource sizes, web content availability in Content Delivery Networks (CDNs), etc. to recognize patterns and make predictions for new request for web page loads. If any new requests come in to load a web page, then the predicted load time is used to determine the need of personalized content item generation.

In certain embodiments, the presence of one or more personalized content items 262 in the edge servers 260 that match the user's preferences and, optionally, match a product that has won a bid in smart bidding are retrieved for further optimization. If the time of running the one or more personalized content items 262 falls within the predicted load time of the entire web page, then the web page load system 210 pushes the one or more personalized content items 262 to the user's web page.

In certain embodiments, if there are no personalized content items 262 that fit within the predicted load time, then the web page load system 210 splits the predicted web page load time into personalized content item generation time (i.e., split generation time) and generated personalized content item run time (i.e., split run time). In certain embodiments, the personalized content item generation time is based on user interests and preferences and predicted by predictive models.

If the personalized content item generation time is within a threshold (which may be set by a system administrator), then the web page load system 210 generates a new personalized content item 272 using the personalized content item generation module 212, which is conditioned with the predicted load time. In certain embodiments, the personalized content item generation module 212 produces videos based on stories created by language models within the predicted load time.

In certain embodiments, if the personalized content item 262 generation time is equal to or greater than the threshold, then the web page load system 210 summarizes an existing personalized content item 262 using the personalized content item summarization module 214. In certain embodiments, the personalized content item summarization module 214 outputs a summarized personalized content item 274 using an existing (i.e., pre-available) personalized content item 262 from the edge server. In certain embodiments, the personalized content item summarization module 214 performs the summarization using video summarization-based diffusion models based on the predicted web page load time. In certain embodiments, if the summarization time is beyond the threshold, then the web page load system 210 fetches more user relevant personalized content items 262 from the CDNs based on available running time and type of personalized content item (e.g., based on content of the website), and these personalized content items 262 are ranked for further optimization.

In addition, the web page load system 210 obtains user consent for data collection and usage and follows relevant regulations. The web page load system 210 enables users to manage their personalized content item preferences and opt in or opt out of targeted personalized content items. In opting in, the users are informed of what data is collected and how it will be used, that any collected user data may be encrypted while being used, that the users can opt-out at any time, and that if they opt out, any user data of the user is deleted.

The web page load system 210 optimizes display of personalized content items to the user based on the user's idle time during web page load. Usually, to encourage users to stay on the web page that is loading slowly (e.g., due to a large amount of website content) and to encourage the users explore the website further without frustration due to the latency, the web page load system 210 displays user relevant personalized content items. Since the personalized content items are personalized based on users' interests, the users tend to remain on the web page at least to watch the personalized content items, during which time the website content may get loaded fully.

The web page load system 210 optimizes, generates, and displays the personalized content items to the users based on their idle time during the web page load. The web page load system 210 optimizes the whole process of generating the personalized content items and displaying them to the users based on the idle time the user spends while the web page loads.

With embodiments, user relevant personalized content items, also known as targeted personalized content items, may be tailored to a specific individual based on interests, browsing behavior, and other relevant data. The aim of user relevant personalized content items is to deliver more relevant and engaging content items to users, increasing the likelihood of the users being interested in the website and waiting for the web page to load.

In certain embodiments, to achieve user relevance in generating or summarizing personalized content items, the web page load system 210 employs various technologies and data collection techniques, such as: cookies, user-specific data, search history, retargeting, and social media data.

Cookies may be described as small text files stored on a user's browser that contain information about their browsing activity. User-specific data may be described as information specific to a user, such as location and occupation, and may be used to create a user data file. Search history may be described as a user's search queries that are analyzed to determine the user's interests. Retargeting involves showing personalized content items to users who have previously visited a particular website or shown interest in a specific product or service. Social media data includes data collected from social media platforms about users' interests, connections, likes, and interactions.

The goal of user relevant personalized content items is to enhance the user experience by showing personalized content items that are more likely to be interesting and useful to the users.

Online advertising, also known as online marketing, Internet advertising, digital advertising or web advertising, is a form of marketing and advertising that uses the Internet to promote products and services to audiences and platform users. Online advertising includes: email marketing, Search Engine Marketing (SEM), social media marketing, many types of display advertising (including web banner advertising), and mobile advertising. The web page load system 210 is able to deliver personalized content items across multiple websites, media services, and platforms (e.g., programmatic advertising).

In certain embodiments, the web page load system 210 displays personalized content items of ads. Personalized ads (i.e., a type of personalized content items) may be described as interest-based advertising and improves advertising relevance for users and increases Return on Investment (ROI) for advertisers.

Unlike existing user relevant ad display techniques that focus on displaying personalized ads to the user that are either static (placeholder ads) or pre-loaded standard content (that are displayed to the users during web page load time, with a video ad being shown to the users getting abruptly interrupted as soon as the website web page is loaded or shows the same ad frame till the website web page loads), the web page load system 210 optimizes and generates new personalized content items 272 or outputs summarized existing personalized content items 274 based on the user's idle time.

To generate or summarize personalized content items, the web page load system 210 may make inferences about a user's interests based on the websites they visit or the applications (apps) they use. This allows the web page load system 210 to target personalized content items according to these interests, providing an improved experience for users and content item providers (e.g., advertisers) alike.

In some cases, the web page load system 210 generates or summarizes the personalized content items based on previously collected or historical data to determine or influence personalized content item selection, including a user's previous search queries, activity, visits to websites or apps, user-specific data, location, etc. Specifically, this would include, for example: interest category targeting, remarketing, targeting customer match lists, and targeting audience lists uploaded.

The web page load system 210 may provide dynamic personalized content items (e.g., dynamic banner ads or dynamic creatives), in which the content, promotions, and calls-to-action change based on user behavior. Dynamic personalized content items are often used in remarketing to reach users who have already interacted with a brand. Static personalized content items, on the other hand, may not adapt based on external data, so they tend to target broader audience groups for brand awareness or product launches.

A website has web pages, and the web page load time refers to the duration it takes for a web page to fully load and become usable for the user. Web page load time impacts user experience, engagement, and conversions on a website. A faster web page load time generally leads to better user satisfaction, higher engagement, and improved search engine rankings.

When users are idle during web page load time, they are not actively interacting with the website. Unlike conventional strategies that may be employed to display ads (e.g., preloaded ads, placeholder ads, personalized ad queues, content-based recommendations, interactive ad formats, and user feedback and preferences), the web page load system 210 provides optimizations to newly generate or regenerate (e.g., summarize an existing personalized content item) and display the personalized content items whose run time matches the users' web page load wait time (less the generation or regeneration time).

For preloading ads, while the web page is loading, the website may take advantage of the idle time to preload ads in the background so that the ads are ready to be displayed when the user becomes active again, minimizing delays and improving the overall user experience. For placeholder ads, instead of leaving blank spaces during idle time, websites may display placeholder ads that act as temporary fillers until the actual targeted ads are loaded. Placeholder ads may be generic or non-intrusive, ensuring that the user's attention is not drawn away from the content when they become active again. For personalized ad queues, based on the user's data file and browsing behavior, the website may maintain a personalized ad queue during idle time and, when the user becomes active, the queued ads may be displayed in a sequence, ensuring a continuous stream of relevant ads.

For content-based recommendations, during idle time, the website may analyze the user's browsing history and the content of the page being loaded to provide personalized content recommendations, which may be in the form of related articles, products, or services, enhancing the user's engagement with the website. For interactive ad formats, to capture the user's attention during idle time, interactive ad formats may include quizzes, games, or mini-surveys that provide an engaging experience for the user while waiting for the page to load. For user feedback and preferences, websites may provide options for users to customize their ad preferences during idle time. This may include the ability to specify their interests, opt-out of certain ad categories, or adjust frequency capping. By allowing users to have more control over their ad experience, websites may deliver more relevant and desired advertisements.

FIGS. 3A-3G illustrate an example of identifying a personalized content item for display during a web page load time.

Figure 3A:
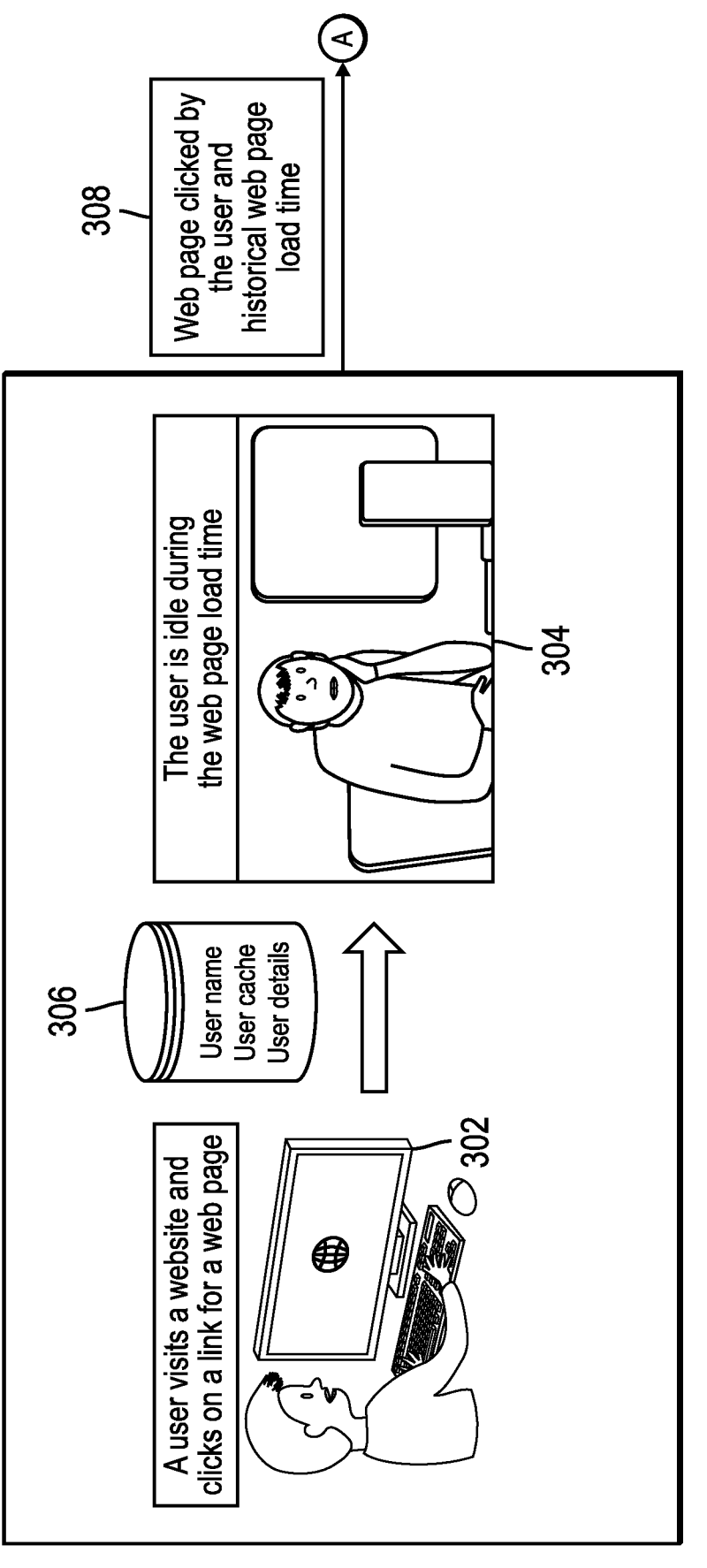
FIG. 3A illustrates a user visiting a website and selecting a web page to be loaded in accordance with certain embodiments.

FIG. 3A illustrates a user visiting a website and selecting a web page to be loaded in accordance with certain embodiments. In the example of FIG. 3A, the user visits a website and clicks on a link 302 and then waits for the web page to load 304. The web page load system 210 optimizes the whole process of generating one or more personalized content items and displaying them to the users based on the idle time the user spends while the web page loads.

The user visits a website and waits for the next web page to load. In such cases, it is possible that the user gets frustrated waiting, which might eventually make the user leave the website, which in turn may cause a negative revenue impact on the website.

When the user clicks on the link and while the web page gets loaded, the web page load system 210 collects user data 306 (e.g., user's name, cache, other interests, etc.) and stores the user data 306 in, for example, a database based on getting user consent.

Figure 3B:
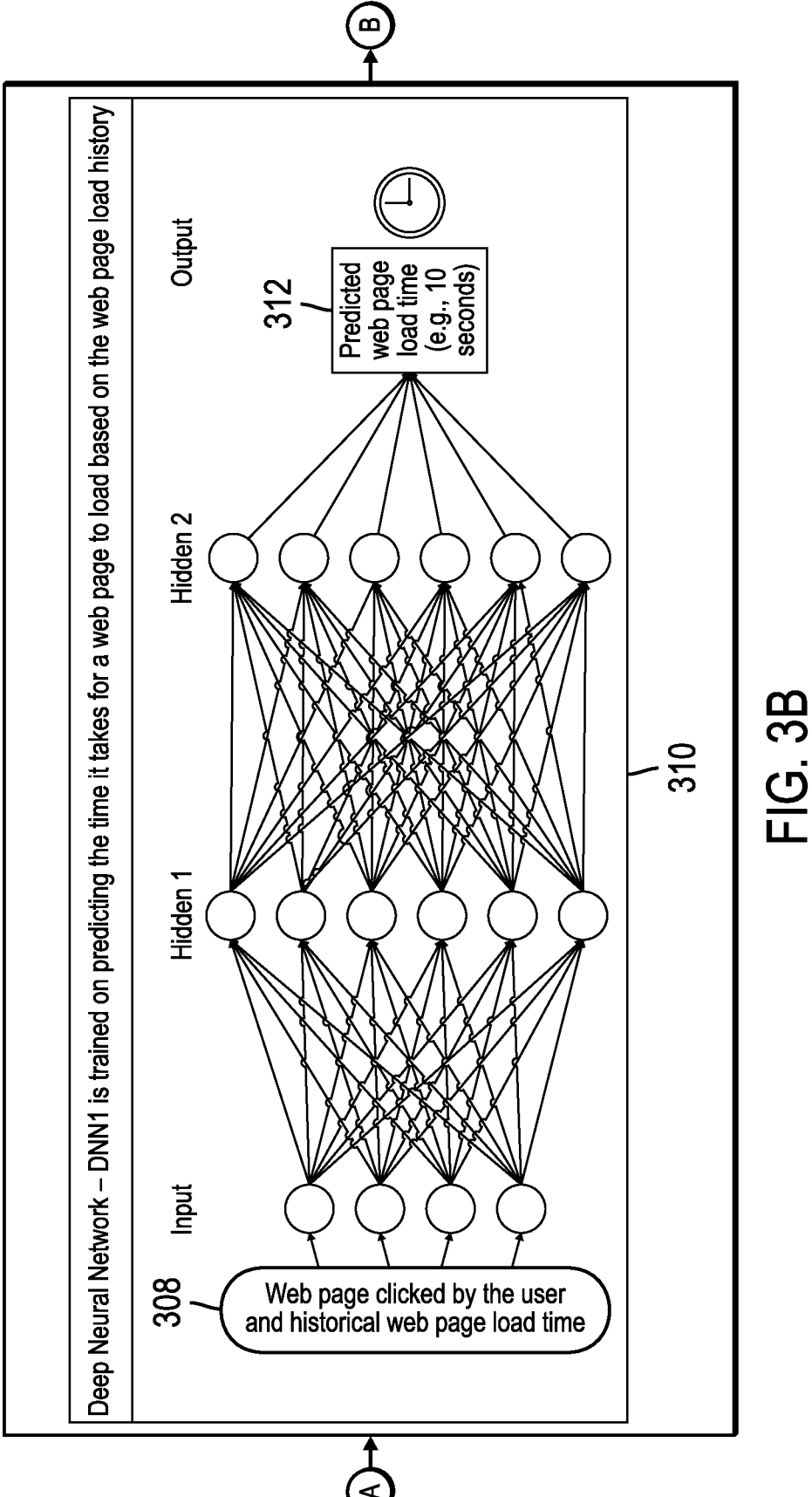
FIG. 3B illustrates use of a first Deep Neural Network (DNN #1) in accordance with certain embodiments.

FIG. 3B illustrates use of a first Deep Neural Network (DNN #1) in accordance with certain embodiments. In certain embodiments after collecting the user information in the database, the web page load system 210 passes input of the web page that was clicked on and web page load history for that web page 308 to a first Deep Neural Network (DNN #1) 310 in FIG. 3B, which is trained on predicting an approximate time for the web page to load based on the historical web page load time and web page data. In certain embodiments, the web page load system 210 passes the user data 306 to the edge servers 320 and passes the web page that was clicked on and web page load history 308 for that web page to a first Deep Neural Network (DNN #1) 310. The first DNN 310 may also be referred to as a web page load time DNN. The first DNN 310 outputs a predicted web page load time 312.

The first DNN 310 has an input layer, multiple hidden layers, and an output layer. For the first DNN 310, the output layer predicts the amount of time for the web page to load based on the past history of the web page load time and web page data.

For the first DNN 310, there is an input vector x of size n, a hidden layer with m units, and a single output unit. During initialization, the weights and biases for each layer in the network are initialized. The hidden layer computation computes the weighted sum of inputs in the hidden layer using the weights (W1) and biases (b1) associated with the hidden layer: $z1=W1*x+b1$. An activation function is applied to introduce non-linearity to the hidden layer output: $a1=activation\_function(z1)$. The output layer computation computes the weighted sum of the hidden layer outputs in the output layer using the weights (W2) and biases (b2) associated with the output layer: $z2=W2*a1+b2$. For the final regression value, an activation function (or linear activation for regression tasks) is applied to obtain the final regression output: $y\_pred=activation\_function(z2)$.

In certain embodiments, common activation functions include sigmoid, tanh, Rectified Linear Unit (ReLU) or linear activation for regression tasks.

In certain embodiments, during training, the network adjusts the weights and biases using a loss function (e.g., mean squared error) and optimization technique (e.g., gradient descent) to minimize the difference between the predicted output (y_pred) and the true output values (y).

Figure 3C:
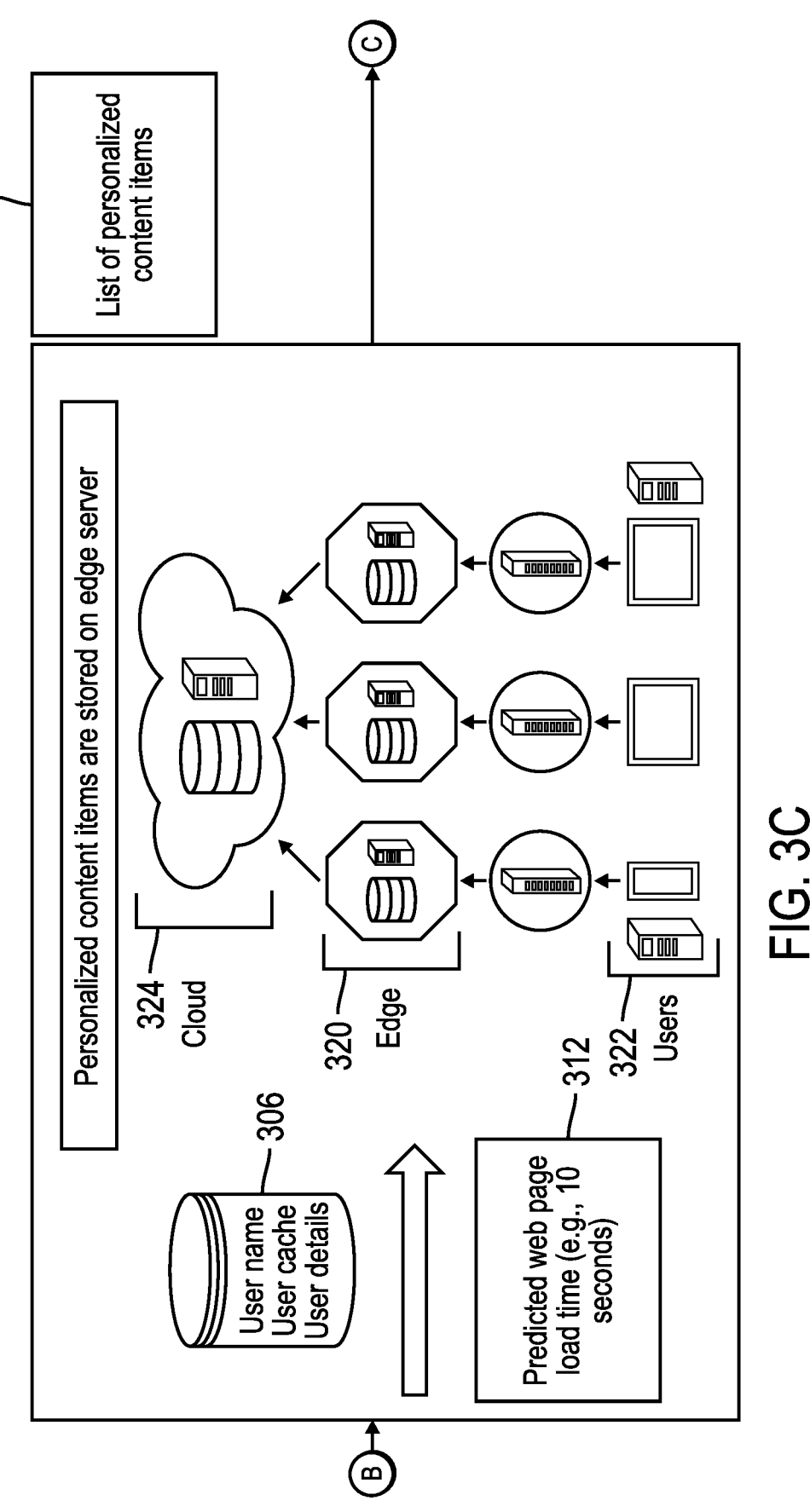
FIG. 3C illustrates use of edge servers in accordance with certain embodiments.

FIG. 3C illustrates use of edge servers in accordance with certain embodiments. In FIG. 3C, the web page load system 210 passes the user data and the predicted web page load time 312 to the edge servers 320. The edge servers 320 store user relevant personalized content items. The edge servers 320 are located near the customer premise (i.e., near the user computers 322). In certain embodiments, the edge servers 320 stored personalized content items based on the users' cache history, interests, geography, etc. These stored, personalized content items may be referred to as existing or pre-available personalized content items or existing personalized content items. In certain embodiments, the edge servers 320 sit between user computers 322 and a cloud infrastructure 324. The web page load system 210 receives from the web servers 320 a list of personalized content items 326. In certain embodiments, at least one edge server 320 looks up the personalized content items for the specific user. The web page load system 210 sends the list of personalized content items 326 to a second DNN (DNN #2) 330. The second DNN 330 may also be referred to as a ranking user relevant personalized content items DNN.

Figure 3D:
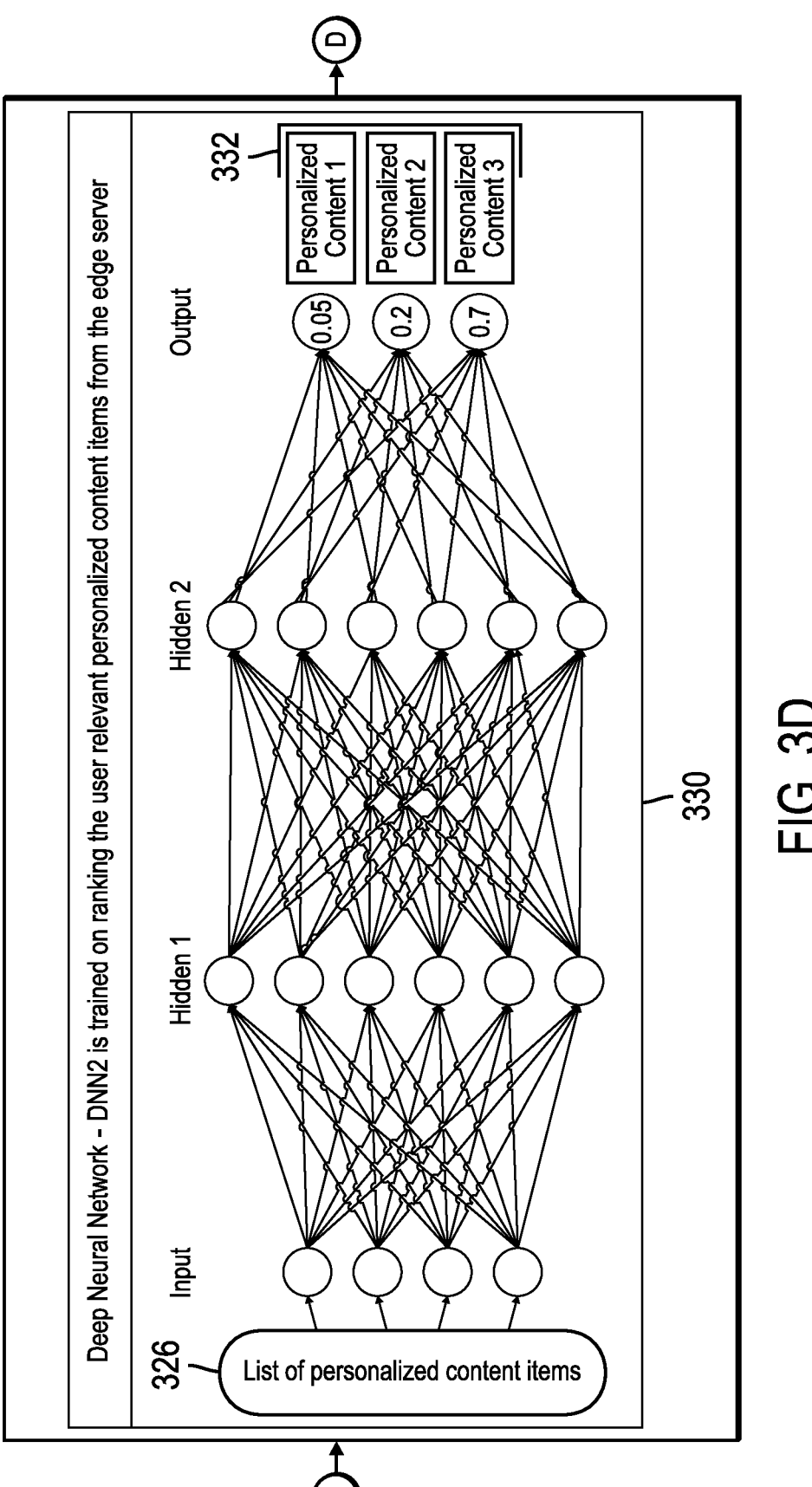
FIG. 3D illustrates use of a second DNN (DNN #2) in accordance with certain embodiments.

FIG. 3D illustrates use of a second DNN (DNN #2) in accordance with certain embodiments. In FIG. 3D, the second DNN 330 receives the list of personalized content items 326 identified by the at least one edge server 320. The second DNN 330 then predicts the more user relevant personalized content items and ranks them for further optimization. That is, the second DNN 330 outputs user relevant personalized content items 332 along with an associated rank, such as 0.05 for personalized content item 1, 0.2. for personalized content item 2, and 0.7 for personalized content item 3. In this example, personalized content item 3 may be determined to be top ranked due to the rank of 0.7 exceeding the other ranks.

In certain embodiments, the second DNN 330 has an input layer, multiple hidden layers and an output layer. For the second DNN 330, the output layer predicts and ranks (scores) the more user relevant personalized content items 332. In certain embodiments, the output layer is a softmax output layer. The softmax function of the softmax output layer is used for multi-class classification tasks to output probability distributions.

The following is performed to output a probability value using softmax in a deep neural network for multi-class classification. For initialization, the weights and biases for each layer in the network are initialized. For the hidden layers, the activations of the hidden layers are computed using the weights and biases. The output layer computation computes the weighted sum of the hidden layer outputs in the output layer using the weights (W) and biases (b) associated with the output layer: $z=W*a+b$. The softmax activation function is applied to obtain the probability distribution across all classes: $y\_pred=softmax(z)$. The softmax function is defined as follows for each class i: $softmax(z\_i) = exp(z\_i)/sum(exp(z\_j))$ for j in all classes.

In certain embodiments, the softmax function takes the exponential of each element in the input vector z and divides it by the sum of exponentials across all classes. This normalization ensures that the output values range between 0 and 1 and sum up to 1, representing a valid probability distribution. In certain embodiments, the resulting y_pred is a vector where each element represents the probability of the corresponding class. The class with the highest probability is typically considered the predicted class label. In certain embodiments, during training, a suitable loss function (e.g., categorical cross-entropy) is used to measure the difference between the predicted probabilities and the true labels. An optimization technique may be used to update the network's weights and biases to minimize the loss and improve the probability estimates.

Figure 3E:
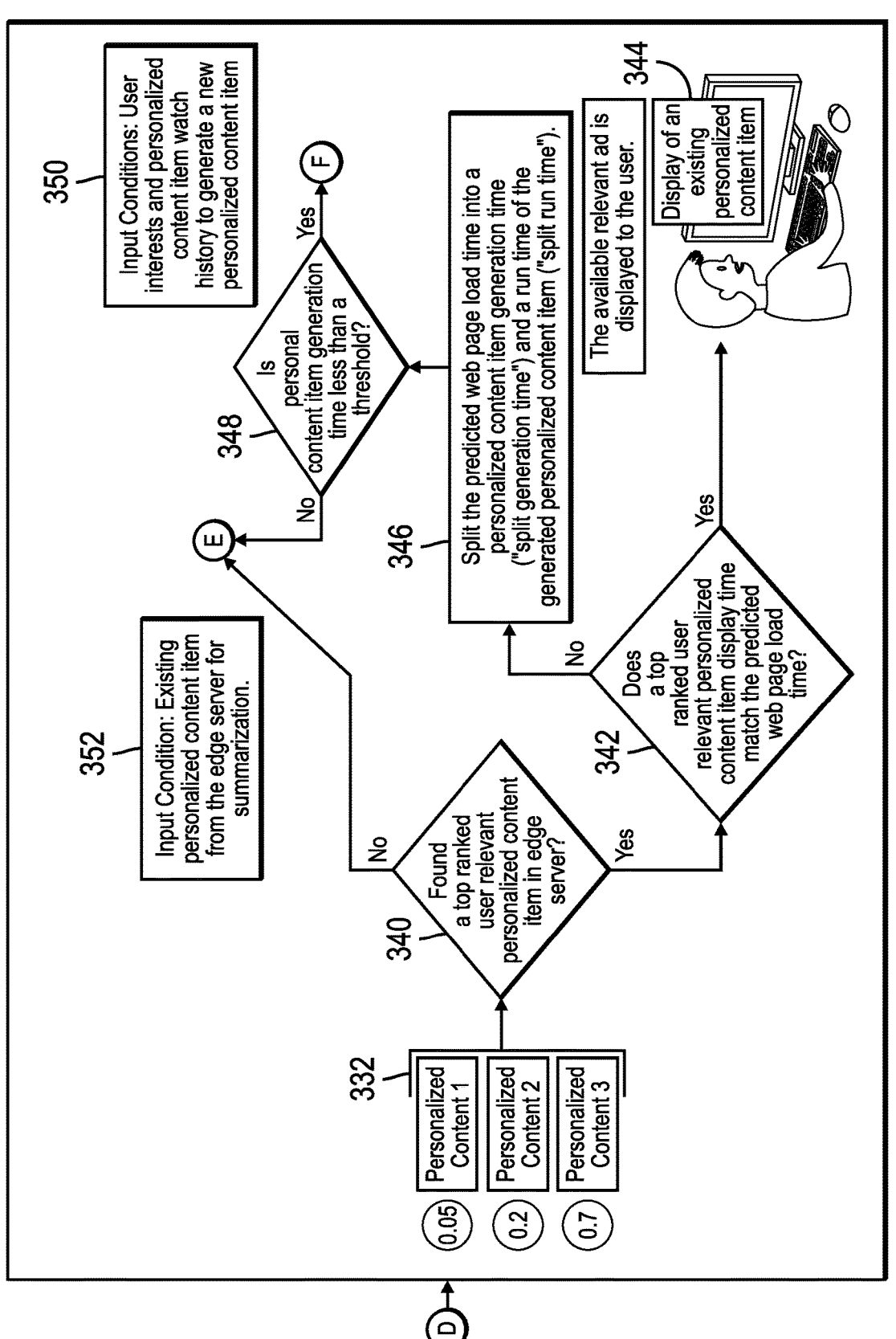
FIG. 3E illustrates operations to generate a new personalized content item or summarize an existing personalized content item in accordance with certain embodiments.

FIG. 3E illustrates operations to generate a new personalized content item or summarize an existing personalized content item in accordance with certain embodiments. In FIG. 3E, block 340, the web page load system 210 determines whether there is a top ranked user relevant personalized content item from the at least one edge server 320. If so, processing continues block 342, otherwise, processing continues to FIG. 3F to summarize an existing personalized content item.

In certain embodiments, the user relevant personalized content item is determined to be top ranked if the associated rank exceeds a desired rank (which may be set by a system administrator). In certain embodiments, a personalized content item is identified from the personalized content items 332 as having the highest rank and checked against the desired rank. In certain embodiments, if multiple personalized content items have the same top rank that exceeds the desired rank, then the top ranked personalized content item is selected from the multiple personalized content items that have the same top rank.

In block 342, the web page load system 210 determines whether the run time of the top ranked user relevant personalized content item matches the web page load time 312. If so, processing continues to 344, otherwise, processing continues to block 346.

In certain embodiments, in block 342, the web page load system 210 takes the top ranked user relevant personalized content item from the second DNN 330 and other personalized content item details (e.g., run time, etc.) from the at least one edge server 320 to check whether the run time of the top ranked user relevant personalized content item matches the predicted web page load time 312 (i.e., user idle time) from the first DNN 310.

In block 344, the web page load system 210 displays the top ranked user relevant personalized content item (i.e., an existing or pre-available personalized content item stored at the edge server 320). That is, as for proactive selection of the existing personalized content item, if the existing user relevant personalized content item run time matches the predicted web page load time 312, then the same personalized content item is rendered from the edge server and displayed to the user during the web page load time. With embodiments, if the web page load system 210 finds a personalized content item on the edge server 320 that matches the user's preferences and the run time of the personalized content item falls within the predicted web page load time, then that personalized content item is displayed to the user while the web page is downloading.

In block 346, the web page load system 210 splits the predicted web page load time into a personalized content item generation time ("split generation time") and a run time of the generated personalized content item ("split run time"). In block 348, the web page load system 210 determines whether the split generation time is less than (i.e., within) a threshold. If so, processing continues to FIG. 3G for generating a new personalized content item to run within the split run time, otherwise, processing continues to FIG. 3F for summarizing an existing personalized content item to run within the split run time.

Figure 3F:
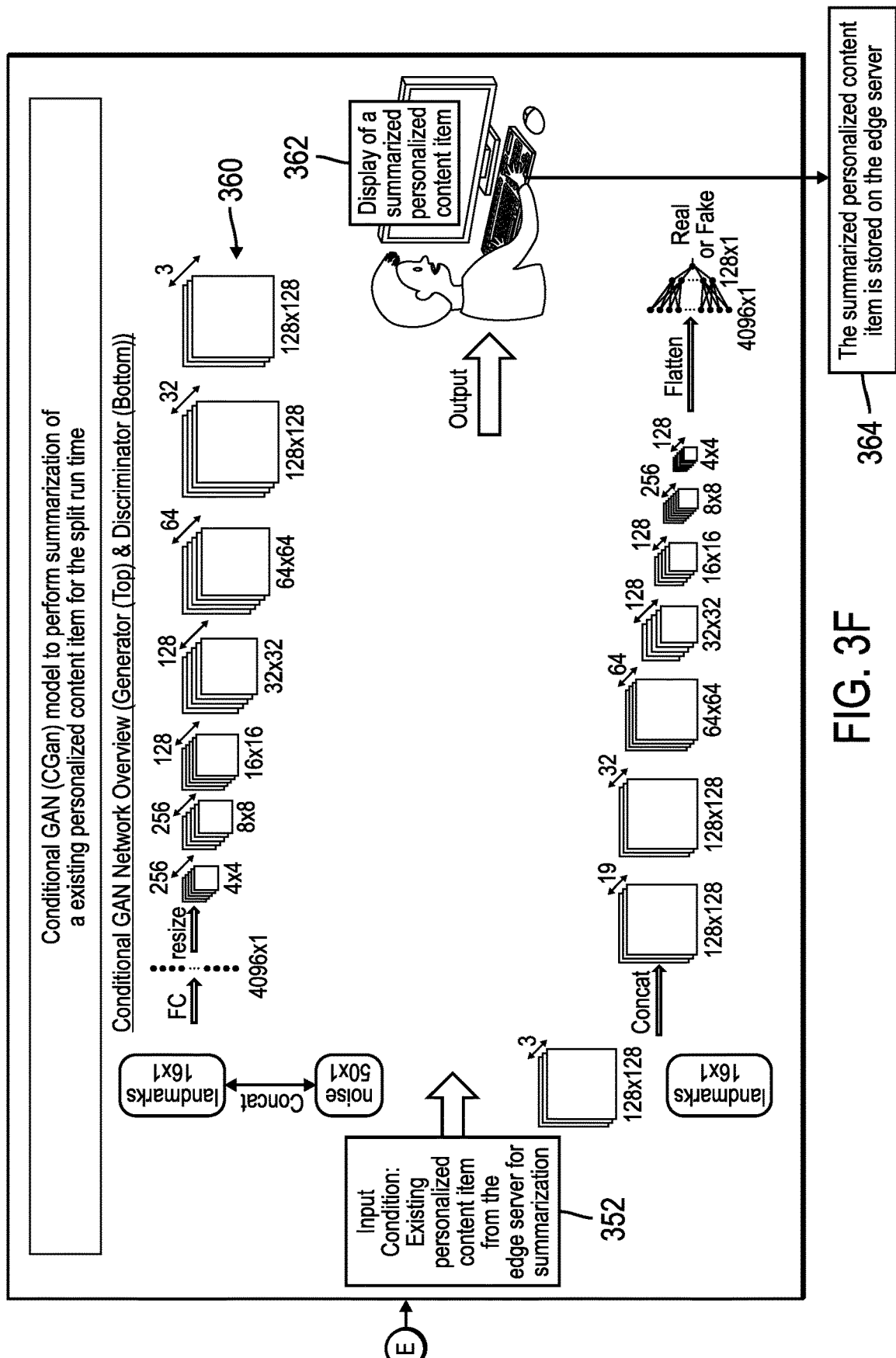
In FIG. 3F, illustrates summarization of an existing personalized content item from the edge server to run within the split run time in accordance with certain embodiments.
Figure 3G:
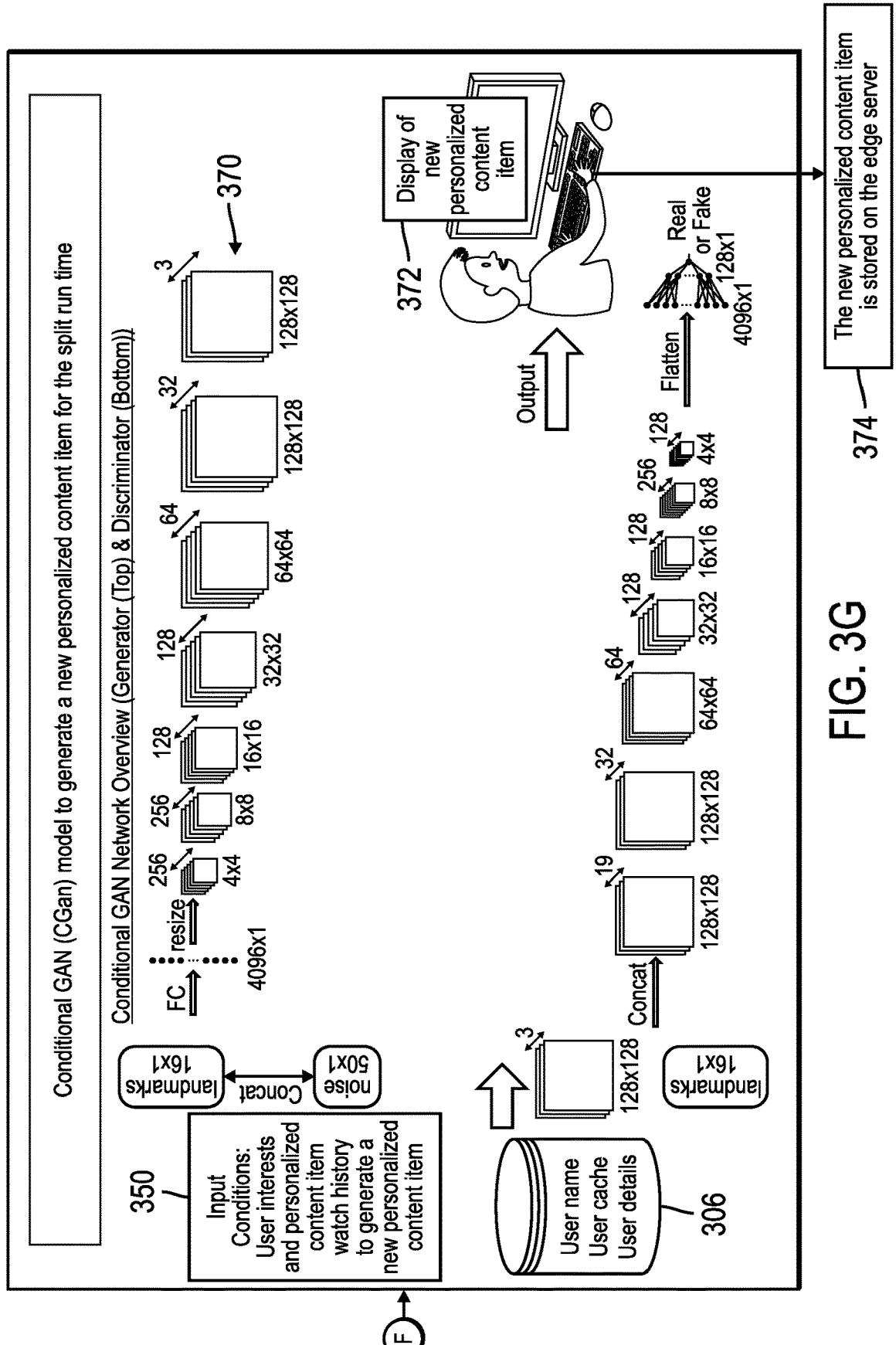
FIG. 3G illustrates generation of a new personalized content item that fits the split run time in accordance with certain embodiments.

FIGS. 3F and 3G use Conditional Generative Adversarial Network (CGAN) models 360, 370. In particular, FIG. 3F uses a first CGAN 360 with a first input condition 350 of an existing personalized content item from the edge server for summarization, while FIG. 3G uses a second CGAN 370 with second input conditions 352 of user interests and a personalized content item watch history to generate a new personalized content item.

In some embodiments, if a top ranked user relevant personalized content item is not found (e.g., the personalized content items 332 have low ranks), then processing continues to FIG. 3F and an existing personalized content item is summarized. If the split generation time equals or exceeds a threshold, then, processing continues to FIG. 3F and an existing personalized content item is summarized. If the split generation time is less than the threshold, then, processing continues to FIG. 3G to generate a new personalized content item.

A CGAN is an extension of a Generative Adversarial Network (GAN) that incorporates conditional information into the generator and discriminator.

The generator takes as input a random noise vector z and a conditional vector c and aims to generate realistic samples that match the given condition. The input to the generator is concatenated: $g\_input=[z, c]$. Then, it passes through a series of hidden layers to generate the output sample. The formula for the generator may be written as:

$$G: g\_input \rightarrow G(z,c).$$

The discriminator takes as input a generated sample or a real sample along with the corresponding condition and aims to classify them as real or fake. The input to the discriminator is concatenated: $d\_input=[x, c]$, where x represents the sample. The discriminator applies a series of hidden layers and outputs a probability value indicating the likelihood of the input being real. The formula for the discriminator may be written as:

$$D: d\_input \rightarrow D(x,c).$$

The adversarial loss is used to train both the generator and the discriminator in an adversarial manner. The adversarial loss encourages the generator to produce samples that the discriminator cannot distinguish from real samples. The adversarial loss is typically computed using the binary cross-entropy loss function.

For the generator, the adversarial loss may be written as:

$$L\_adv(G) = -\log(D(G(z, c), c))$$

For the discriminator, the adversarial loss may be written as:

$$L\_adv(D) = -\log(D(x, c)) - \log(1 - D(G(z, c), c))$$

Depending on the specific task and requirements, additional loss functions may be incorporated into the CGAN. For example, for conditional video generation of embodiments, the generator may be further optimized using pixel-wise loss functions, such as Mean Squared error (MSE) or perceptual loss.

In accordance with embodiments, the CGAN aims to optimize the generator and discriminator simultaneously by minimizing the adversarial losses. The generator learns to produce video samples that fool the discriminator, while the discriminator learns to differentiate between real and generated video samples conditioned on the input condition.

FIG. 3F illustrates summarization of an existing personalized content item from the edge server to run within the split run time in accordance with certain embodiments. In particular, the web page load system 210 provides summarization of an existing personalized content item that is stored in the edge server 320 to run within the split run time in accordance with certain embodiments. In this case, the input condition 350 to the CGAN 360 is the existing personalized content item. In certain embodiments, the existing personalized content item is selected from the personalized content items output by the second DNN 330. The summarization depends on the split run time (e.g., a longer summary may be used for a longer split run time, while a shorter summary may be used for a shorter split run time).

The web page load system 210 passes the existing personalized content item through the first CGAN 360, which summarizes (i.e., recreates) the existing personalized content item with a run time matching the split run time. That is, the CGAN 360 outputs a summarized personalized content item with a run time corresponding to the split run time. Then, the web page load system 210 displays the summarized personalized content item for the user (block 362). In addition, the web page load system 210 stores the summarized personalized content item on the edge server (bock 364), so that this summarized personalized content item may subsequently be used as another existing personalized content item.

FIG. 3G illustrates generation of a new personalized content item that fits the split run time in accordance with certain embodiments. In FIG. 3G, the web page load system 210 provides proactive generation of a new personalized content item that fits the split run time. In this case, the input conditions 352 to the CGAN 370 are user interests (e.g., keywords) and personalized content item watch history. In certain embodiments, the web page load system 210 determines the user interests using the user data 306.

The web page load system 210 uses the second CGAN 370 to create a new personalized content item for the user based on user interests. In certain embodiments, the web page load system 210 provides a list of user interest keywords as the condition to the CGAN, which creates a new personalized content item that matches the split run time and that attracts the users' interest in the personalized content item during idle time. The web page load system 210 displays the new the personalized content item for the user (block 372). In addition, the web page load system 210 stores the new personalized content item on the edge server (bock 374), so that this new personalized content item may subsequently be used as another existing personalized content item.

Once the personalized content item is summarized (i.e., regenerated) (FIG. 3F) or newly generated (FIG. 3G) and displayed to the user, the web page load system 210 stores the personalized content item in the edge server 320 and possibly other locations (e.g., a main server in the cloud or in an on-premise server) for the future user.

In certain embodiments, the edge server 320 is a distributed computing infrastructure that is geographically closer to the users, reducing latency and enhancing performance. The stored personalized content items (e.g., videos) on the edge server 320 may be used as additional training data for the CGANs 360, 370 video generation. The videos may be fed back into the training pipeline to refine and improve the generator network of the CGANs 360, 370. This may involve retraining the network with the newly generated videos and optimizing the network's parameters to enhance the quality and relevance of future generated videos.

Figure 4A:
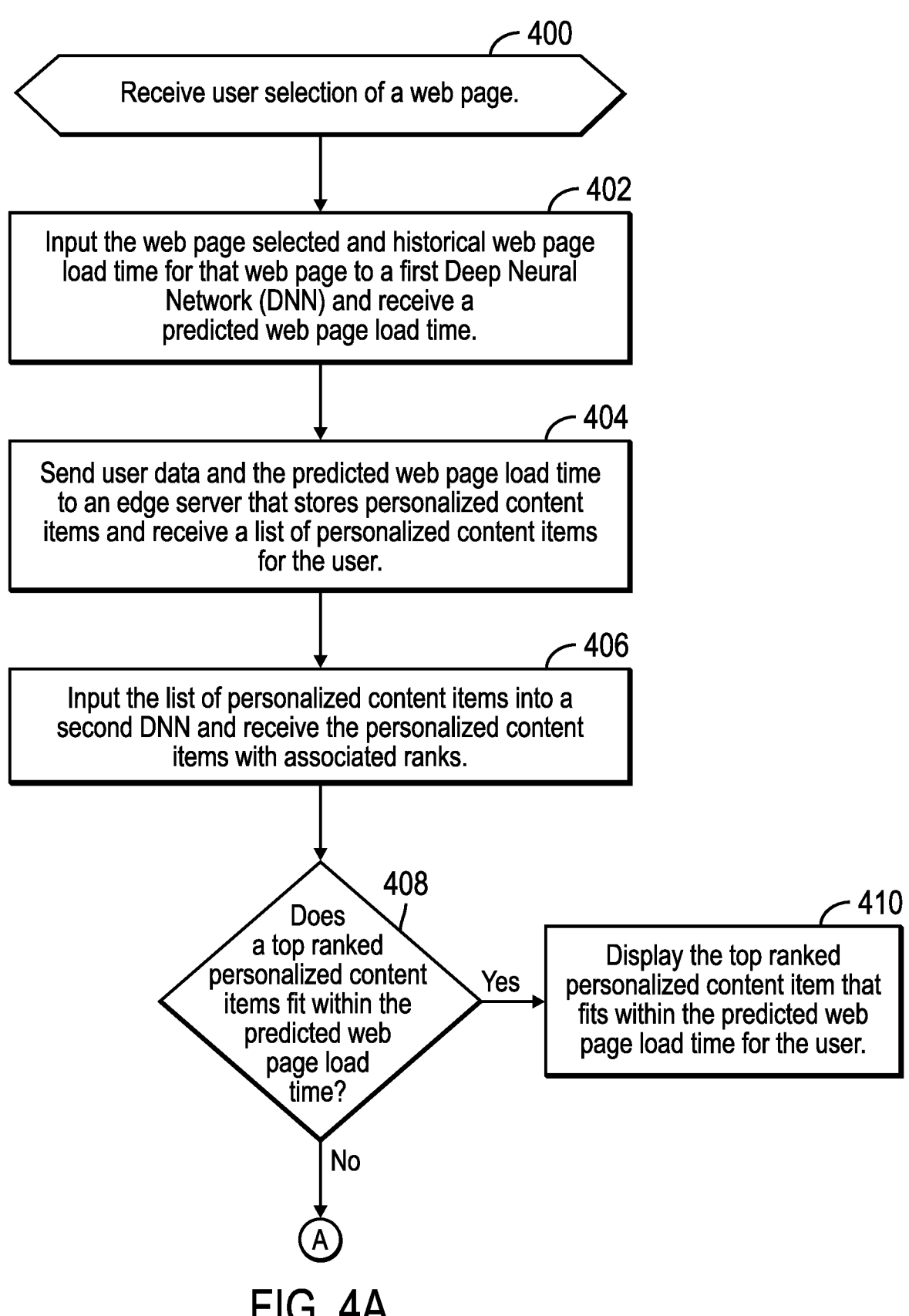
FIGS. 4A and 4B illustrate, in a flowchart, operations for optimizing and generating a personalized content item for display during web page load time via edge computing in accordance with certain embodiments.
Figure 4B:
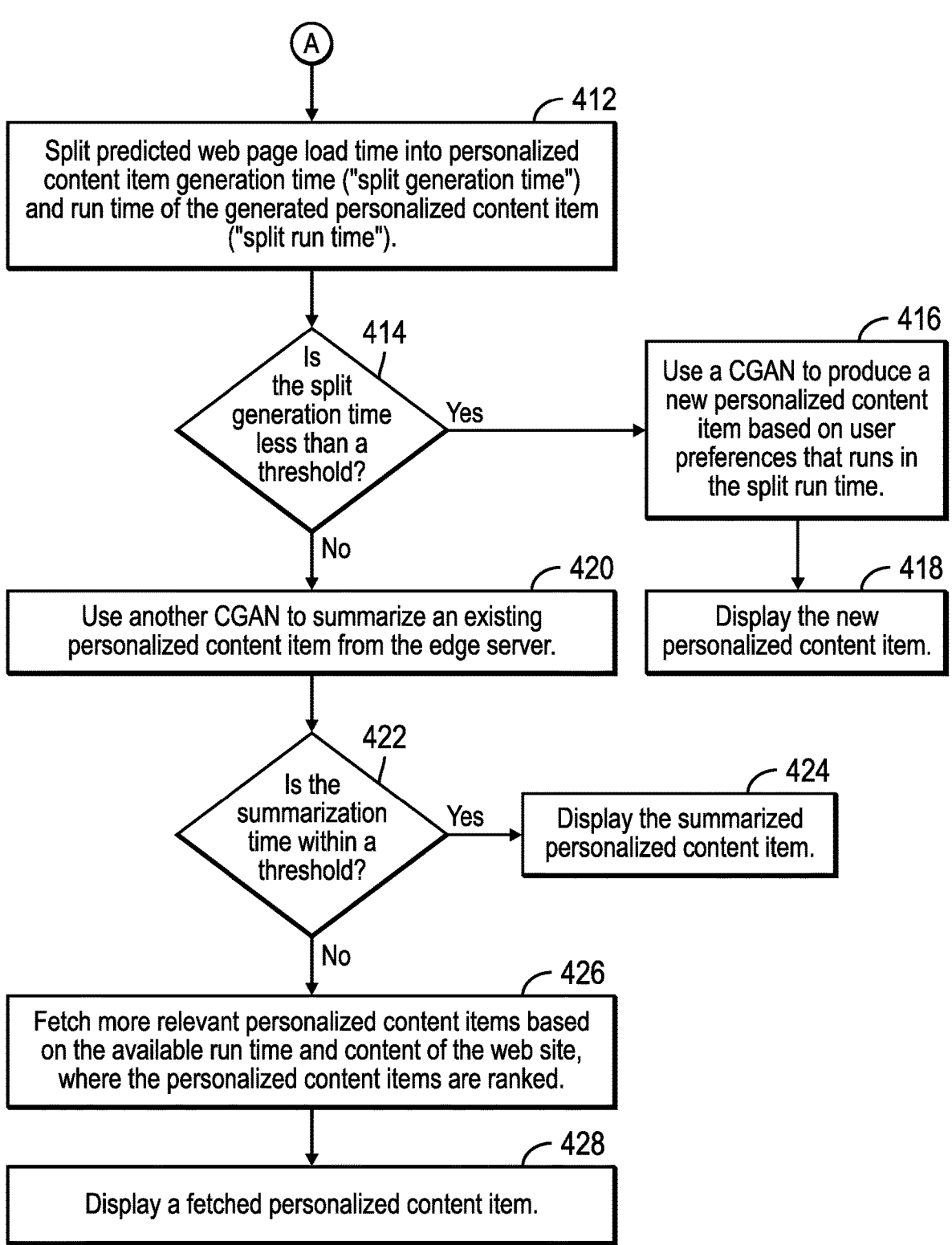

FIGS. 4A and 4B illustrate, in a flowchart, operations for optimizing and generating a personalized content item for display during web page load time via edge computing in accordance with certain embodiments. Control begins at block 400 with the web page load system 210 receiving user selection of a web page.

In block 402, the web page load system 210 inputs the web page selected and historical web page load time for that web page to a first Deep Neural Network (DNN) and receives a predicted web page load time. In block 404, the web page load system 210 sends user data and the predicted web page load time to an edge server that stores personalized content items and receive a list of personalized content items for the user. In block 406, the web page load system 210 inputs the list of personalized content items into a second DNN and receives the personalized content items with associated ranks.

In block 408, the web page load system 210 determines whether a top ranked personalized content item fits within the predicted web page load time. If so, processing continues to block 410, otherwise, processing continues to block 412 (FIG. 4B). In block 410, the web page load system 210 displays the top ranked personalized content item that fits within the predicted web page load time for the user.

In block 412, the web page load system 210 splits predicted web page load time into personalized content item generation time ("generation time") and run time of the generated personalized content item ("split run time").

In block 414, the web page load system 210 determines whether the split generation time is less than a threshold. If so, processing continues to block 416, otherwise, processing continues to block 420. In block 416, the web page load system 210 uses a CGAN to produce a new personalized content item based on user preferences that runs in the split run time. In block 418, the web page load system 210 displays the new personalized content item.

In block 420, the web page load system 210 uses another CGAN to summarize an existing personalized content item from the edge server. In certain embodiments, the summarized personalized content item is created to run in the split run time. In block 422, the web page load system 210 determines whether the summarization time is within the threshold. In certain embodiments, this threshold is the same threshold used in block 414, while in other embodiments, the thresholds in blocks 414 and 422 may be different. If so, processing continues to block 424, otherwise, processing continues to block 426. In block 424, the web page load system 210 displays the summarized personalized content item.

In block 426, the web page load system 210 fetches more relevant personalized content items based on the available split run time and content of the web site, where the personalized content items are ranked. In block 428, the web page load system 210 displays a fetched personalized content item.

FIG. 5 illustrates, in a flowchart, operations for generating a new personalized content item based on web page load time. Control begins at block 500 with the web page load system 210 predicting a web page load time of a web page selected by a user. In block 502, the web page load system 210 receives a list of personalized content items with corresponding ranks. In block 504, the web page load system 210, in response to determining that a top ranked personalized content item of the list of personalized content items does not run (e.g., a video personalized content item does not complete playing) within the web page load time, split the web page load time into a split generation time and a split run time. In block 506, the web page load system 210, in response to determining that the split generation time is less than a threshold, generates a new personalized content item based on user preferences of the user to run within the split run time and displays the new personalized content item. In block 508, the web page load system 210, in response to determining that the split generation time is equal to or greater than the threshold, summarizes an existing personalized content item that runs within the split run time and displays the summarized personalized content item.

Thus, the web page load system 210 uses machine learning models to predict the users' idle time during web page load and to generate the personalized content items (e.g., ad videos) whose run time is optimized. The web page load system 210 optimizes the entire process of generating the personalized content items and displaying these to the users based on the idle time that the user spends while the web page loads. The web page load system 210 uses machine learning modules to optimize and generate the user relevant personalized content items based on the users' idle time prediction.

In certain embodiments, the web page load system 210 uses one DNN (e.g., a first DNN) to predict the users' idle time, which is the time taken for the web page to load based on the web page load history. In certain embodiments, the web page load system 210 uses another DNN (e.g., a second DNN) to rank the user relevant personalized content items from the edge server. In this manner, the second DNN predicts which of the personalized content items are more relevant.

In certain embodiments, the web page load system 210 uses a CGAN (e.g., a first CGAN) to summarize a pre-available personalized content item from the edge server and uses another CGAN (e.g., a second CGAN) to newly generate a personalize content item whose run time matches the users' idle time during the web page load.

In certain embodiments, the web page load system 210 uses edge computing to store the newly generated and the summarized personalized content items in the distributed edge servers for future reuse.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method, comprising operations for:

predicting a web page load time of a web page selected by a user based on one or more real time load factors that are selected from a group consisting of a user's traffic, a server load time, resource sizes, and web content availability;

receiving a list of personalized content items with corresponding ranks; and in response to determining that a top ranked personalized content item of the list of personalized content items does not run within the web page load time, splitting the web page load time into a split generation time and a split run time;

in response to determining that the split generation time is less than a threshold, generating a new personalized content item based on user preferences of the user that runs within the split run time; and displaying the new personalized content item during the split run time while the web page is loading; and in response to determining that the split generation time is equal to or greater than the threshold, summarizing an existing personalized content item to run within the split run time; and displaying the summarized personalized content item during the split run time while the web page is loading.

2. The computer-implemented method of claim 1, wherein the web page and historical web page load time for that web page are input to a Deep Neural Network (DNN), which outputs the predicted web page load time.

3. The computer-implemented method of claim 1, wherein the operations further comprise:

sending user data and the predicted web page load time to an edge server that stores a plurality of personalized content items, wherein the list of personalized content items are selected from the plurality of personalized content items and returned by the edge server.

4. The computer-implemented method of claim 1, wherein the list of personalized content items are input into a Deep Neural Network (DNN), which outputs the list of personalized content items with the corresponding ranks.

5. The computer-implemented method of claim 1, wherein user interests are input into a Conditional Generative Adversarial Network, which outputs the new personalized content item.

6. The computer-implemented method of claim 1, wherein the existing personalized content item is input into a Conditional Generative Adversarial Network, which outputs the summarized personalized content item.

7. The computer-implemented method of claim 1, wherein the operations further comprise:

in response to determining that a top ranked personalized content item of the list of personalized content items runs within the web page load time, displaying the top ranked personalized content item.

8. A computer program product, the computer program product comprising a computer readable storage medium having program instructions embodied therewith, the program instructions executable by a processor to cause the processor to perform operations for:

predicting a web page load time of a web page selected by a user based on one or more real time load factors that are selected from a group consisting of a user's traffic, a server load time, resource sizes, and web content availability;

receiving a list of personalized content items with corresponding ranks; and in response to determining that a top ranked personalized content item of the list of personalized content items does not run within the web page load time, splitting the web page load time into a split generation time and a split run time;

in response to determining that the split generation time is less than a threshold, generating a new personalized content item based on user preferences of the user that runs within the split run time; and displaying the new personalized content item during the split run time while the web page is loading; and in response to determining that the split generation time is equal to or greater than the threshold, summarizing an existing personalized content item to run within the split run time; and displaying the summarized personalized content item during the split run time while the web page is loading.

9. The computer program product of claim 8, wherein the web page and historical web page load time for that web page are input to a Deep Neural Network (DNN), which outputs the predicted web page load time.

10. The computer program product of claim 8, wherein the program instructions are executable by the processor to cause the processor to perform operations for:

sending user data and the predicted web page load time to an edge server that stores a plurality of personalized content items, wherein the list of personalized content items are selected from the plurality of personalized content items and returned by the edge server.

11. The computer program product of claim 8, wherein the list of personalized content items are input into a Deep Neural Network (DNN), which outputs the list of personalized content items with the corresponding ranks.

12. The computer program product of claim 8, wherein user interests are input into a Conditional Generative Adversarial Network, which outputs the new personalized content item.

13. The computer program product of claim 8, wherein the existing personalized content item is input into a Conditional Generative Adversarial Network, which outputs the summarized personalized content item.

14. The computer program product of claim 8, wherein the program instructions are executable by the processor to cause the processor to perform operations for:

in response to determining that a top ranked personalized content item of the list of personalized content items runs within the web page load time, displaying the top ranked personalized content item.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

predicting a web page load time of a web page selected by a user based on one or more real time load factors that are selected from a group consisting of a user's traffic, a server load time, resource sizes, and web content availability;

receiving a list of personalized content items with corresponding ranks; and in response to determining that a top ranked personalized content item of the list of personalized content items does not run within the web page load time, splitting the web page load time into a split generation time and a split run time;

in response to determining that the split generation time is less than a threshold, generating a new personalized content item based on user preferences of the user that runs within the split run time; and displaying the new personalized content item during the split run time while the web page is loading; and in response to determining that the split generation time is equal to or greater than the threshold, summarizing an existing personalized content item to run within the split run time; and displaying the summarized personalized content item during the split run time while the web page is loading.

16. The computer system of claim 15, wherein the web page and historical web page load time for that web page are input to a Deep Neural Network (DNN), which outputs the predicted web page load time.

17. The computer system of claim 15, wherein the program instructions further perform operations comprising:

sending user data and the predicted web page load time to an edge server that stores a plurality of personalized content items, wherein the list of personalized content items are selected from the plurality of personalized content items and returned by the edge server.

18. The computer system of claim 15, wherein the list of personalized content items are input into a Deep Neural Network (DNN), which outputs the list of personalized content items with the corresponding ranks.

19. The computer system of claim 15, wherein user interests are input into a Conditional Generative Adversarial Network, which outputs the new personalized content item.

20. The computer system of claim 15, wherein the existing personalized content item is input into a Conditional Generative Adversarial Network, which outputs the summarized personalized content item.

* * * * *